Sept. 6, 1949.  A. H. HATCHETTE  2,480,923
HOOK
Filed June 6, 1945

A. H. Hatchette
INVENTOR.

BY *A. Knowles.*
ATTORNEYS.

Patented Sept. 6, 1949

2,480,923

UNITED STATES PATENT OFFICE 2,480,923

HOOK

Andrew H. Hatchette, Cleveland, Ohio

Application June 6, 1945, Serial No. 597,902

1 Claim. (Cl. 292—107)

This invention relates to window or closure fasteners of the hook type, the primary object of the invention being to provide a fastener of this character wherein the hook is provided with means to securely hold the hook within the keeper, which is in the form of a screw eye.

An important object of the invention is to provide a device of this character wherein the hook is formed with a yieldable section adapted to frictionally engage the keeper, securely holding the hook within the eye or keeper against displacement or operation from a point exteriorly of the window or closure, to which the fastener is connected.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing

Figure 1:
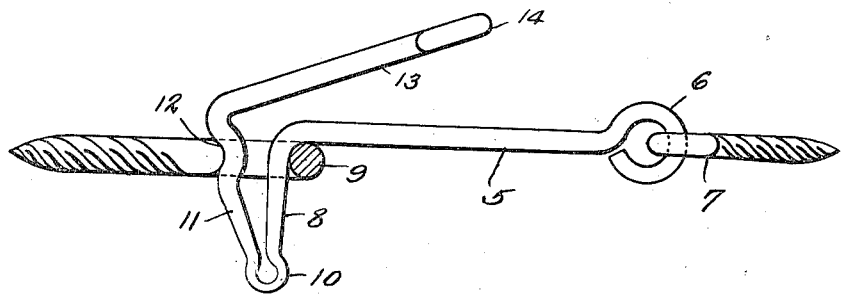
Figure 1 is an elevational view of a hook type fastener, constructed in accordance with the invention, the keeper of the fastener being shown in section.
Figure 2:
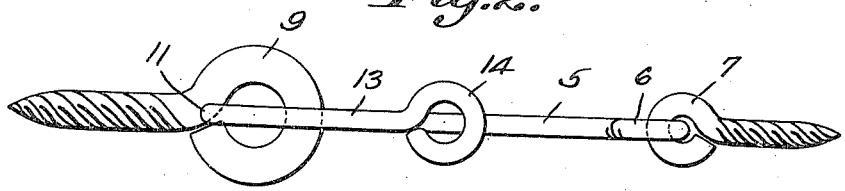
Figure 2 is a plan view thereof.

Referring to the drawing in detail, the hook of the fastener, embodies a shank 5 which is formed with an eye 6 at one end thereof to be engaged by the screw-eye 7, by means of which the hook is secured to a closure.

The hook is constructed of semi-rigid material, and is constructed to form a right-angled end 8 that extends into the keeper to secure the fastener, the keeper being indicated by the reference character 9.

In forming the right-angled end portion 8, the material of which the hook is formed, is bent at a point substantially intermediate its ends, and is formed with a loop 10 and a securing arm 11, the securing arm 11 being formed by extending a portion of the metal of which the hook is formed, rearwardly at an acute angle, as is clearly shown by Fig. 1 of the drawing. The securing arm thus formed, is yieldable, and the natural tendency of the arm is to move outwardly, away from the right-angled end 8. An offset portion 12 is provided in the securing arm 11, the curvature of the offset portion 12, being such that it will fit the curved edge of the keeper 9, within the eye thereof.

The upper end of the securing arm 11 extends above the upper edge of the hook proper, and extends upwardly providing an actuating arm 13 which is formed with a loop 14 at its free end, providing a finger piece whereby the actuating arm 13 may be depressed to move the securing arm out of contact with the keeper 9, to permit the hook to be removed from the keeper. Due to this construction, it will be obvious that when the end 8 of the hook is positioned within the keeper, the securing arm 11 will move towards the right-angled end 8, and since the distance between the right-angled end 8 and the securing arm 11, is greater than the diameter of the opening of the keeper, the securing arm will be caused to snap into contact with the keeper, when the hook is moved to its limit within the keeper, or to the position as shown by Fig. 1.

Figure 3:
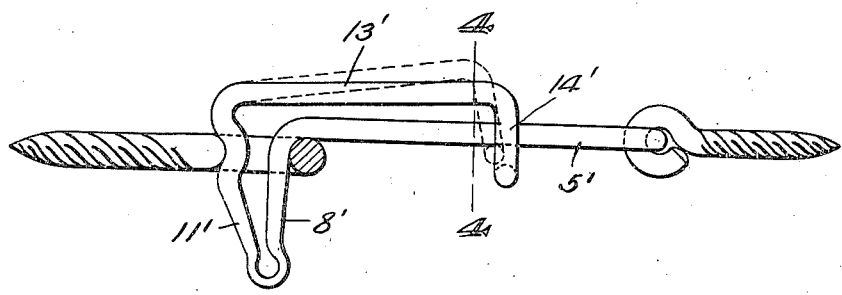
Figure 3 is an elevational view of a modified form of fastener, the keeper being shown in section.
Figure 4:
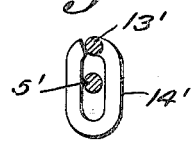
Figure 4 is a sectional view taken on line 4—4 of Fig. 3.

In the form of the invention as shown by Fig. 3 of the drawing, the hook is formed with a shank 5', which is identical with the shank of the hook shown by Fig. 1 of the drawing. In this form of the invention, the right-angled end 8' is formed with a securing arm 11' that is an integral part of the actuating arm 13'. In this form of the invention the actuating arm 13' is formed with a loop 14' that extends downwardly and encircles the shank 5'. This loop 14' prevents the actuating arm 13 from being swung upwardly too far, or to a point to bend the actuating arm 13'.

From the foregoing it will be seen that due to the construction shown and described, I have provided a fastener of the hook-and-eye type, which cannot be operated from a point exteriorly of the room, only with great difficulty. In order to release the hook, it is necessary to operate the actuating arm 13 to disengage the actuating arm and the keeper.

What is claimed is:

A fastener embodying a length of semi-rigid material constructed to provide a shank and a hook at one end of the shank, said hook embodying a member extended at right angles with respect to the shank, a yieldable member formed integral with the hook and being extended at an acute angle with respect to the first mentioned member, the latter member adapted to frictionally engage a keeper in which the hook is positioned, an actuating arm formed integral with the latter member and being extended over the shank of the hook, and a loop formed at the free end of the actuating arm, said loop encircling the shank of the hook.

ANDREW H. HATCHETTE.

REFERENCES CITED

The following references are of record in the file of this patent:

UNITED STATES PATENTS

| Number | Name | Date |
|---|---|---|
| 1,023,747 | Matthews | Apr. 16, 1912 |
| 2,117,159 | Giardina et al. | May 10, 1938 |